US012620614B2

(12) United States Patent (10) Patent No.: US 12,620,614 B2

Song et al. (45) Date of Patent: May 5, 2026

(54) ROLL FOR SUPPORTING ELECTRODE AND ELECTRODE MANUFACTURING APPARATUS INCLUDING THE SAME

(71) Applicant: LG Energy Solution, Ltd., Seoul (KR)

(72) Inventors: Won Seob Song, Daejeon (KR); Hwan Han Kim, Daejeon (KR); Jaehyuk Choi, Daejeon (KR); Soohyung Hong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 842 days.

(21) Appl. No.: 17/908,389

(22) PCT Filed: Nov. 16, 2021

(86) PCT No.: PCT/KR2021/016808

§ 371 (c)(1),
(2) Date: Aug. 31, 2022

(87) PCT Pub. No.: WO2022/108305

PCT Pub. Date: May 27, 2022

(65) Prior Publication Data

US 2023/0088002 A1 Mar. 23, 2023

(30) Foreign Application Priority Data

Nov. 17, 2020 (KR) ........................ 10-2020-0153748

(51) Int. Cl.
*H01M 10/04* (2006.01)
*B30B 3/00* (2006.01)
(Continued)

(52) U.S. Cl.
CPC ........... *H01M 10/0404* (2013.01); *B30B 3/00* (2013.01); *B30B 3/005* (2013.01); *H01M 4/0435* (2013.01);
(Continued)

(58) Field of Classification Search
CPC ....... H01M 50/20; H01M 4/0435; B30B 3/00; B30B 15/0029; B30B 3/04
See application file for complete search history.

(56) References Cited

U.S. PATENT DOCUMENTS 6,105,648 A 8/2000 De Graaf et al.
2012/0204787 A1 8/2012 Nakahata et al.
(Continued)

FOREIGN PATENT DOCUMENTS

CN 103117371 A 5/2013
CN 104143628 A 11/2014
(Continued)

OTHER PUBLICATIONS

Extended European Search Report including Written Opinion for Application No. 21895073.1 dated Jul. 5, 2024. 8 Pgs.
(Continued)

*Primary Examiner* — Niki Bakhtiari
*Assistant Examiner* — Ryan K. Blackwell-Rudasill
(74) *Attorney, Agent, or Firm* — Lerner David LLP

(57) ABSTRACT

An electrode supporting roll according to an embodiment of the present invention supports an electrode sheet, and includes: a main roll that includes a plurality of sub-rolls rotatably coupled to a single first shaft, while being in contact with the electrode sheet; and a press portion that is positioned at the opposite side of the electrode, while disposing the main roll therebetween, and reciprocally moves to push at least one of the plurality of sub-rolls toward the electrode sheet.

10 Claims, 6 Drawing Sheets

(51) Int. Cl.
    *H01M 4/04*         (2006.01)
    *H01M 4/139*      (2010.01)

(52) U.S. Cl.
    CPC .............. *H01M 4/04* (2013.01); *H01M 4/139*
             (2013.01); *Y02E 60/10* (2013.01)

(56)           References Cited

U.S. PATENT DOCUMENTS

| | | |
|---|---|---|
| 2013/0074711 A1 | 3/2013 | Uematsu et al. |
| 2020/0194772 A1* | 6/2020 | Yanai ..................... B21D 33/00 |
| 2021/0086388 A1 | 3/2021 | Lee et al. |
| 2021/0151736 A1 | 5/2021 | Bang |

FOREIGN PATENT DOCUMENTS

| | | |
|---|---|---|
| CN | 104218259 A | 12/2014 |
| CN | 110809507 A | 2/2020 |
| CN | 211027736 U | 7/2020 |
| JP | 2003157835 A | 5/2003 |
| JP | 2012069266 A | 4/2012 |
| JP | 2018114480 A | 7/2018 |
| KR | 101331385 B1 | 11/2013 |
| KR | 20160056553 A | 5/2016 |
| KR | 101810145 B1 | 1/2018 |
| KR | 101830287 B1 | 2/2018 |
| KR | 20180114380 A | 10/2018 |
| KR | 101980226 B1 | 5/2019 |
| KR | 102115991 B1 | 5/2020 |
| KR | 20200046788 A | 5/2020 |
| KR | 20200121502 A | 10/2020 |
| WO | 98/18613 A1 | 5/1998 |

OTHER PUBLICATIONS

International Search Report for Application No. PCT/KR2021/016808 mailed Mar. 4, 2022, pp. 1-3.

* cited by examiner

-- Prior Art --

ROLL FOR SUPPORTING ELECTRODE AND ELECTRODE MANUFACTURING APPARATUS INCLUDING THE SAME

CROSS-REFERENCE TO RELATED APPLICATION(S)

This application is a national stage entry under 35 U.S.C. § 371 of International Application No. PCT/KR2021/016808, filed on Nov. 16, 2021, which claims priority to Korean Patent Application No. 10-2020-0153748, filed on Nov. 17, 2020, the entire contents of each of which are hereby incorporated herein by reference.

TECHNICAL FIELD

The present invention relates to an electrode supporting roll and an electrode manufacturing apparatus including the same, and particularly it relates to an electrode supporting roll that can variably provide a step depending on a position and an electrode manufacturing apparatus including the same.

BACKGROUND ART

As technology development and demand for mobile devices increase, the demand for rechargeable batteries as an energy source is rapidly increasing. In particular, rechargeable batteries are of great interest not only for mobile devices such as mobile phones, digital cameras, laptops, and wearable devices, but also as energy sources for power devices such as electric bicycles, electric vehicles, and hybrid electric vehicles.

A rechargeable battery may be formed by inserting an electrode assembly formed of a positive electrode, a negative electrode, and a separator into a case and then sealing the same. Here, the electrode for a rechargeable battery such as a positive electrode or a negative electrode includes a coated portion and an uncoated portion on a current collector, the coated portion has an active material layer coated with an active material slurry, and the uncoated portion corresponds to a portion where the active material slurry is not coated. Here, the uncoated portion includes an insulating coated portion coated with an insulating material and a non-insulating coated portion not coated with an insulating material. In particular, in the case of the uncoated portion, there is a problem that folds or wrinkles may occur during the electrode manufacturing process, and a device capable of controlling this is required.

FIG. 1 shows a conventional electrode supporting roll and an electrode sheet passing the same.

Referring to FIG. 1, an electrode sheet 1 is formed in a structure including a coated portion 7 coated with an electrode mixture 5 on a metal foil 3 and an uncoated portion 9 on which the electrode mixture 5 is not applied. The electrode sheet 1 is transferred to one side via at least one roller 10, or is rolled between two rollers 10 and sequentially undergoes a corresponding process.

In this case, the electrode sheet 1 may be bent in a width direction due to thermal deformation due to temperature during a drying process. In particular, the electrode sheet 1 is supported on the roll 10 and during the movement and process, wrinkles and folds occur in the uncoated portion 9 due to a thickness difference between the coating portion 7 and the uncoated portion 9, and this causes disconnection, thereby causing a problem in that equipment efficiency and productivity deteriorate due to an increase in loss.

The above information disclosed in this Background section is only for enhancement of understanding of the background of the invention, and therefore it may contain information that does not form the prior art that is already known in this country to a person of ordinary skill in the art.

DISCLOSURE

Technical Problem

An object to be solved of the present invention is to provide an electrode supporting roll that can prevent occurrence of wrinkles of an uncoated portion due to a thickness difference between a coated portion and the uncoated portion of an electrode and an electrode manufacturing apparatus including the same.

The task to be solved by the present invention is not limited to the above-mentioned tasks, and the tasks not mentioned can be clearly understood by a person of an ordinary skill in the technical field to which the present invention belongs from this specification and the attached drawing.

Technical Solution

An electrode supporting roll according to an embodiment of the present invention supports an electrode sheet, and includes: a main roll that includes a plurality of sub-rolls rotatably coupled to a single first shaft, while being in contact with the electrode sheet; and a press portion that is positioned at the opposite side of the electrode, while disposing the main roll therebetween, and reciprocally moves to push at least one of the plurality of sub-rolls toward the electrode sheet.

The press portion may include a height adjusting portion connected to the press roll and adjusted in length in the vertical direction to reciprocally move the press roll toward the sub-roll.

The press portion may include a support portion that is disposed on the opposite side of the height adjusting portion connected to the press roll to support the height adjusting portion.

The support may be horizontally movably coupled to the second shaft disposed parallel to the first shaft.

The height adjusting portion may be a cylinder or screw.

The support may be slidably coupled along the second shaft.

The electrode sheet may include a coated portion and an uncoated portion, and a sub-roll corresponding to the uncoated portion of the plurality of sub-rolls may be raised toward the electrode sheet side by the press portion to generate a step difference between the plurality of sub-rolls.

The press portion may be capable of reciprocal movement in a direction parallel to the first shaft, and the press portion may reciprocally move to place the press roll in a position of the sub-roll corresponding to the uncoated portion.

The electrode supporting roll may adjust the tension applied to the electrode sheet by adjusting the amount of movement of the sub-roll by the height adjusting portion.

An electrode manufacturing apparatus according to another embodiment of the present invention may include the above-stated electrode supporting roll.

Advantageous Effects

According to the embodiments, a surface step of the electrode supporting roll can be applied variably in position, and thus, even though the position of the uncoated portion is changed, it is not limited thereto, and tension can be applied to the uncoated portion to prevent wrinkling of the uncoated portion due to the thickness difference between the coated portion of the electrode and the uncoated portion. Therefore, it is possible to easily prevent the occurrence of wrinkles and folds regardless of the shape of the electrode sheet.

The effect of the present invention is not limited to the above-mentioned effects, and the effects not mentioned will be clearly understood by a person of an ordinary skill in the technical field to which the present invention belongs from this specification and the accompanying drawings.

MODE FOR INVENTION

Figure 1:
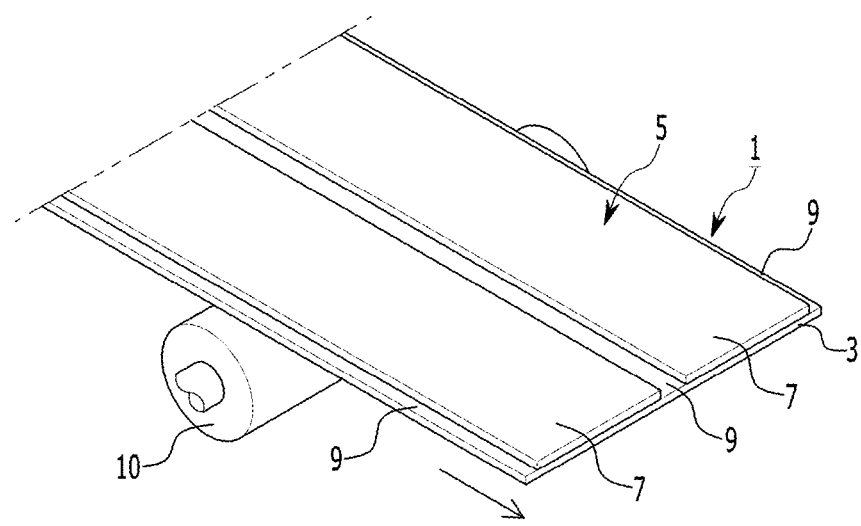
FIG. 1 shows a conventional electrode supporting roll and an electrode sheet passing the same.

Hereinafter, with reference to the accompanying drawing, various embodiments of the present invention will be described in detail such that a person of an ordinary skill in the technical field to which the present invention belongs can easily practice. The present invention may be implemented in several different forms and is not limited to the embodiments described herein.

In order to clearly explain the present invention, parts irrelevant to the description are omitted, and like reference numerals designate like elements throughout the specification.

In addition, since the size and thickness of each component shown in the drawing are arbitrarily indicated for better understanding and ease of description, the present invention is not necessarily limited to the illustrated drawings. In the drawings, the thickness of layers, films, panels, regions, etc., are exaggerated for clarity. In the drawing, the thickness of some layers and regions is exaggerated for better understanding and ease of description.

In addition, unless explicitly described to the contrary, the word "comprise", and variations such as "comprises" or "comprising", will be understood to imply the inclusion of stated elements but not the exclusion of any other elements.

In addition, unless explicitly described to the contrary, the word "comprise", and variations such as "comprises" or "comprising", will be understood to imply the inclusion of stated elements but not the exclusion of any other elements.

Hereinafter, an electrode manufacturing apparatus according to an embodiment of the present invention will be described. However, the description will be made based on one end of an electrode for a rechargeable battery, but it is not necessarily limited thereto, and the same or similar content may be described for the other end. In addition, the electrode will be described with reference to an upper surface of upper and lower surfaces of a current collector, but the present invention is not necessarily limited thereto, and the electrode may be described with the same or similar contents even in the case of the lower surface.

Figure 2:
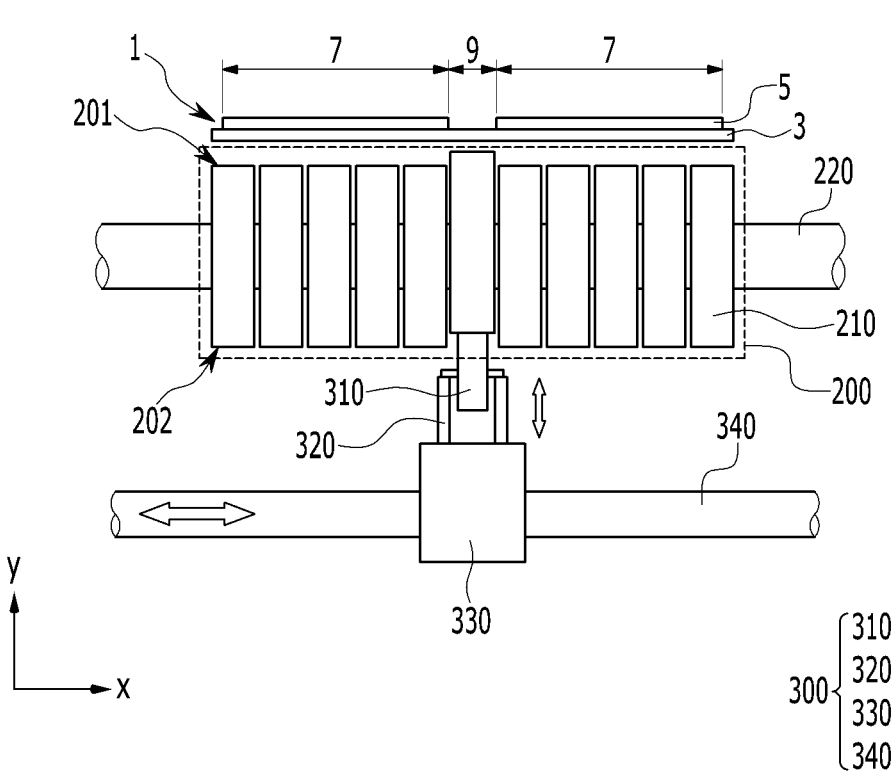
FIG. 2 shows an electrode supporting roll according to an embodiment of the present invention.
Figure 3:
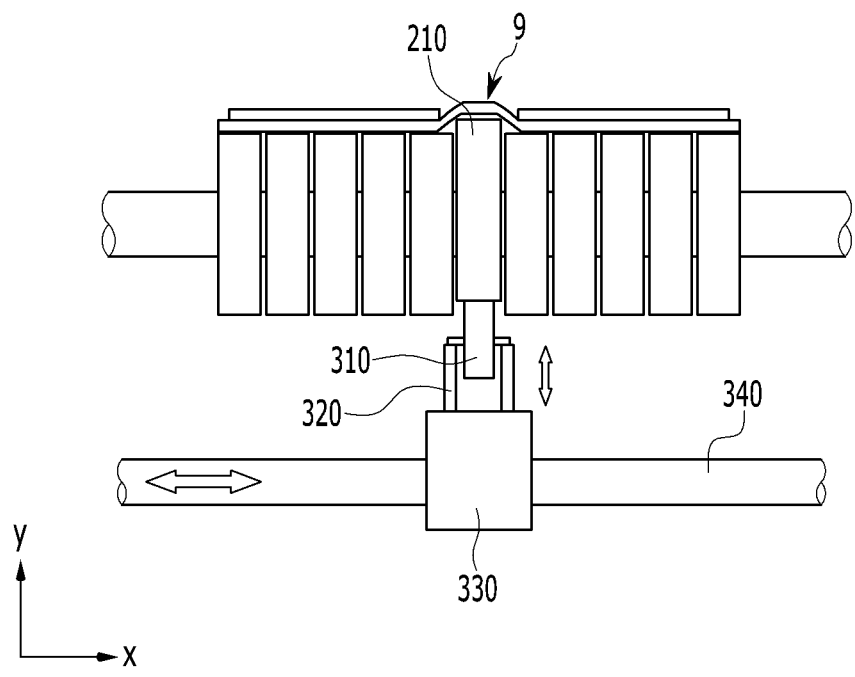
FIG. 3 shows a state in which tension is applied to an uncoated portion by the electrode supporting roll of FIG. 2.

FIG. 2 shows an electrode supporting roll according to an embodiment of the present invention. FIG. 3 shows a state in which tension is applied to an uncoated portion by the electrode supporting roll of FIG. 2.

Referring to FIG. 2 and FIG. 3, an electrode supporting roll according to an embodiment of the present invention includes a main roll 200 that supports an electrode sheet 1 and a press portion 300 formed to adjust a step of a plurality of sub-rolls 210 included in the main roll 200.

The main roll 200 serves to support the electrode sheet 1 in a state where an electrode mixture 5 is applied on the metal foil 30. Such a main roll 200 may be applied to a transfer roll, a rolling roll, a slitter, and the like during an electrode manufacturing process, and may be applied without limitation as long as the roll serves to support the electrode sheet 1.

The main roll 200 is formed to include a plurality of sub-rolls 210 rotatably coupled to one first shaft 220. The plurality of sub-rolls 210 are bearing-type members that are separated from each other. That is, the plurality of sub-rolls 210 are arranged side by side in the x-axis direction, while including a hole that can be fitted in the first shaft 220 extending in the x-axis direction, thereby forming the main roll 200 as a whole. The number of the plurality of sub-rolls 210 is not particularly limited, and may be appropriately adjusted according to a width of the supporting electrode sheet 1. In addition, a width of the sub-roll 210 may be set to be similar to or smaller than a width of the uncoated portion 9 of the electrode sheet 1, and is not particularly limited.

A step of the plurality of sub-rolls 210 may be adjusted by the press portion 300. The press portion 300 is positioned on the opposite side of the electrode sheet 1 with the main roll 200 interposed therebetween. That is, a first portion 201 of the main roll 200 is positioned on the electrode sheet 1 and a second portion 202 is positioned on the press portion 300. Here, the first portion 201 and the second portion 202 refer to the upper and lower portions (upper and lower in the y-axis direction in the drawing) with respect to a first shaft 220 in the circular cross-section of the main roll 200, respectively.

The press portion 300 includes a press roll 310 in contact with the sub-roll 210. The press roll 310 is connected to a height adjusting portion 320 and can be raised and lowered (moved in the y-axis direction in the drawing) by the height adjusting portion 320. Here, the height adjusting portion 320 may be formed of a cylinder or a screw, whereby a length may be adjusted in the vertical direction (i.e., the y-axis direction in the drawing). When the press roll 310 is raised by the height adjusting portion 320 and one of the sub-rolls 210 is pushed up, that is, when it is moved to the electrode sheet 1 side, the tension applied to the electrode sheet 1 in the portion corresponding to the sub-roll 210 is increased. In this case, a size of a hole formed in the center of the sub-roll 210 is formed to be larger than a diameter of the first shaft 220 into which the hole is inserted, and is formed to have a degree of freedom to rise when pressed by the press roll 310. However, the present invention is not limited thereto, and when the sub-roll 210 is raised to cause a step, it may be appropriately applied.

In addition, the press portion 300 includes a support portion 330 connected to the lower portion of the height adjusting portion 320 to support the height adjusting portion 320. The support portion 330 is inserted into a second shaft 340 disposed parallel to the first shaft 220, and is formed to move left and right along the second shaft 340. That is, the height adjusting portion 320 may be positioned under the sub-roll 210 of the corresponding position by moving the support portion 330 left and right to correspond to a position at which the tension is to be increased in the electrode sheet 1. By such a configuration, the position to adjust the tension can be easily adjusted at a desired position rather than being fixed.

In more detail, referring to FIG. 3, when more tension needs to be applied to the uncoated portion 9 of the electrode sheet 1, the press roll 310 is placed below a sub-roll 210 corresponding to the uncoated portion 9 by horizontally moving the support portion 330. Then, when the press roll 310 is raised by the height adjusting portion 320, the press roll 310 pushes up the correspondingly positioned sub-roll 210, and thus the sub-roll 210 applies tension to the uncoated portion 9 of the electrode sheet 1. Thereby, it is possible to maintain a flat state by tension without the corresponding portion being folded or wrinkled.

In this case, since the plurality of sub-rolls 210 are included according to the present embodiment, the sub-roll 210 for each position where the tension needs to be adjusted is raised thereby adjusting the tension not only in one place but also in each intended position. Conventionally, as a configuration for removing wrinkles on the electrode sheet 1, an expander roll such as a groove roll or a crown roll was used. However, in this case, there was a limitation that tension was added by being concentrated in the center in the width direction of the electrode sheet 1, or that the tension increase was applied equally to the entire electrode sheet 1. On the other hand, according to the embodiment of the present invention as described above, the support 330 is moved left and right by moving the press roll 310 such that increased tension can be applied to the electrode sheet 1 as much as desired at a desired position. In addition, the protrusion height of the sub-roll 210 can also be adjusted by adjusting the height of the height adjusting portion 320, thereby adjusting the degree of the increased tension.

A known coupling method may be used so as to enable the moving support 330 to slide along the second shaft 340 to move left and right. For example, a combined structure of a linear motion (LM) block and an LM rail can be used. That is, the support 330 includes an LM block, or the support 330 is formed as an LM block, and the second shaft 340 is formed as an LM rail, thereby enabling slidable coupling. Alternatively, the second shaft 340 may have a screw shape such that the support part 330 may move left and right through the screw movement, but is not particularly limited.

Figure 4:
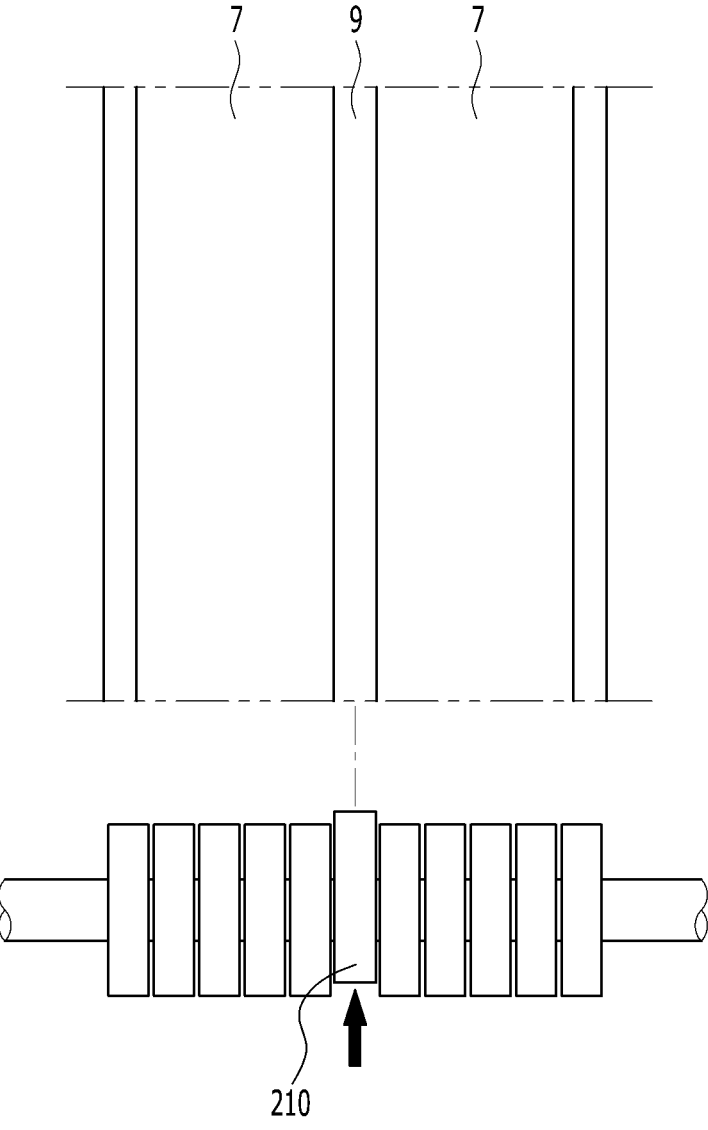
FIG. 4 to FIG. 6 show various application aspects of applying the electrode supporting roll according to the embodiment of the present invention according to a state of the electrode sheet.
Figure 5:
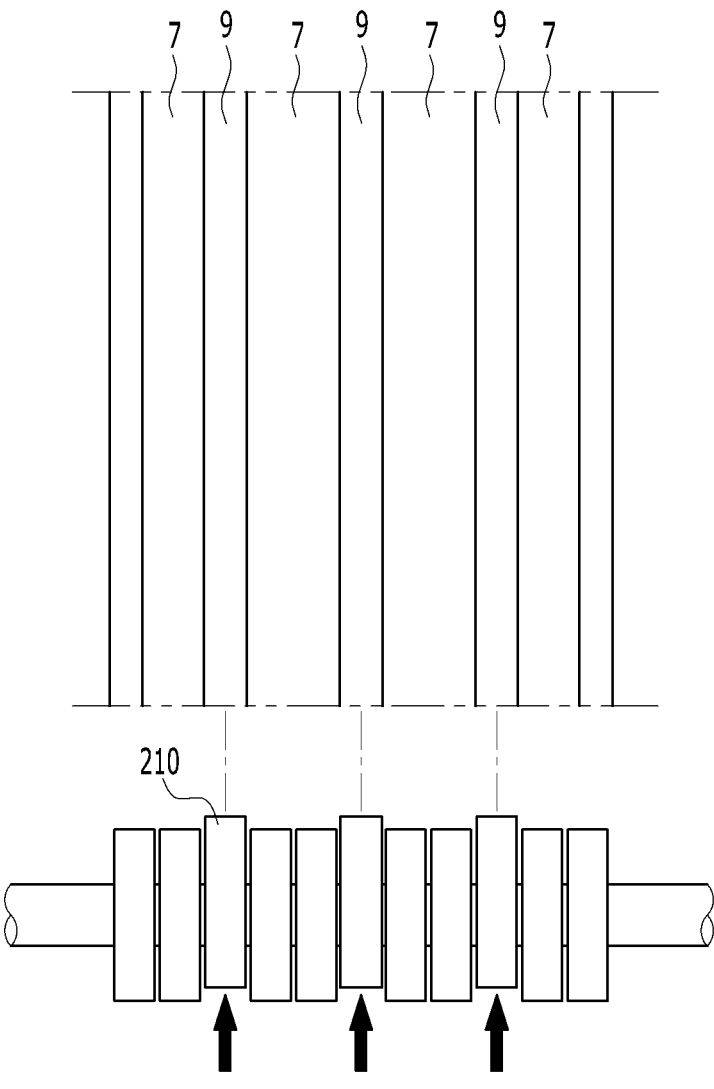
Figure 6:
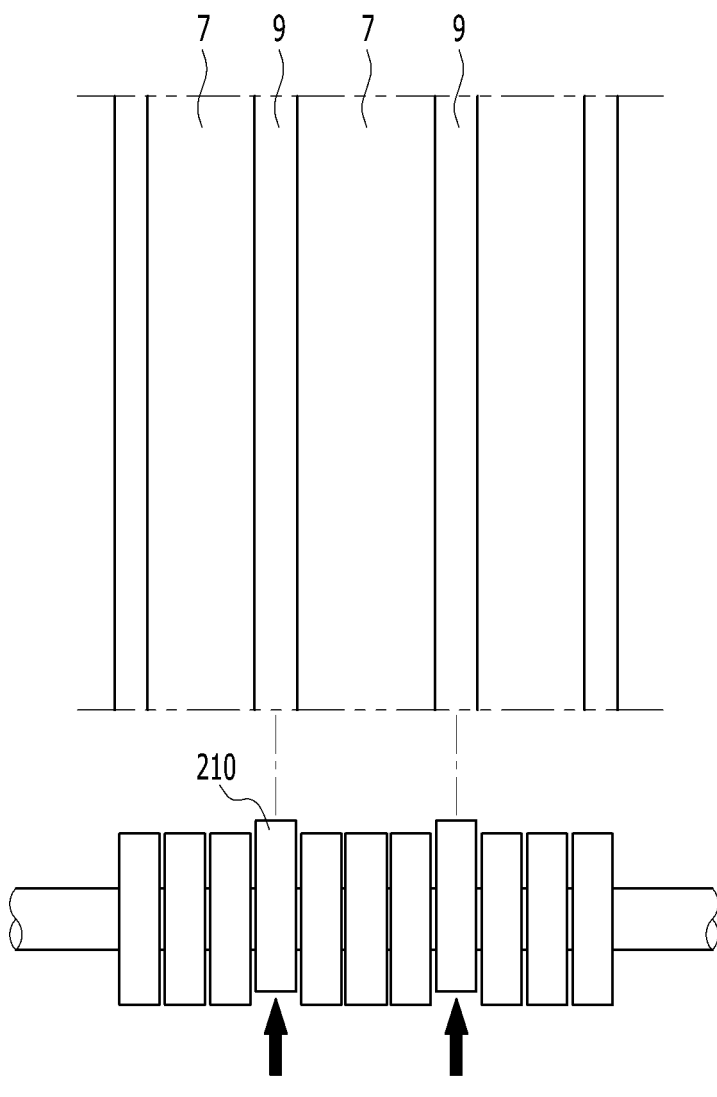

FIG. 4 to FIG. 6 show various application aspects of applying the electrode supporting roll according to the embodiment of the present invention according to a state of the electrode sheet.

Referring to FIG. 4 to FIG. 6, the electrode supporting roll can be appropriately deformed according to the position and the location where tension is to be applied. For example, as shown in FIG. 4, when the tension in only a portion of the middle portion needs to be increased, the press roll 310 is placed under a sub-roll 210 corresponding to the portion by moving the support part 330 left and right, thereby raising the sub-roll 210 and then applying to the process. In addition, as shown in FIG. 5, when three uncoated portions 9 are positioned between coated portions 7 and tension for the corresponding portion needs to be increased, three sub-rolls 210 corresponding to the respective positions are raised by moving the support portion 330 left and right and then applied to the process. In addition, as shown in FIG. 6, when two uncoated portions 9 are positioned between coated portions 7 and tension for the corresponding portion needs to be increased, two sub-rolls 210 corresponding to the respective positions are raised by moving the support portion 330 left and right and then applied to the process.

As such, according to the embodiment of the present invention, it is possible to apply tension to the electrode sheet in various forms in various positions. In addition, in the drawings, only an example in which tension is applied by matching one sub-roll 210 at one location is described, but the present invention is not limited thereto, and it is also possible to apply the tension by matching a plurality of sub-rolls 210 to one location when a width of the portion to be increased is wide. In addition, although it is not the uncoated portion 9, the tension can be adjusted in various forms by varying the protrusion height of the sub-roll 210 in response to the portion requiring tension adjustment.

An electrode manufacturing apparatus according to another embodiment of the present invention may include the above-described electrode supporting roll. The electrode supporting roll described above may be applied to various processes in the electrode manufacturing apparatus. For example, it may be applied to a transfer roll, a rolling roll, a slitter, and the like, and may be appropriately applied to a roll portion that supports the electrode sheet. However, the present invention is not limited thereto and is applicable to various secondary batteries that can be used with electrodes for rechargeable batteries, and it also belongs the scope of the present invention.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

1: electrode sheet
7: coated portion
9: uncoated portion
100: electrode supporting roll
200: main roll
210: sub-roll
220: first shaft
300: press portion
310: press roll
320: height adjusting portion
330: support portion
340: second shaft

The invention claimed is:

1. An electrode supporting roll that is configured to support an electrode sheet, the electrode supporting roll comprising:

a main roll that includes a plurality of sub-rolls rotatably coupled to a single first shaft, the plurality of sub-rolls configured to be placed in contact with the electrode sheet at a first side of the main roll; and a press portion that is positioned at a second side of the main roll opposite the first side, the press portion being configured to reciprocally move to push at least one of the plurality of sub-rolls toward the electrode sheet, wherein the single first shaft extends through a central hole of each of the plurality of sub-rolls that is larger than a diameter of the single first shaft, such that each of the plurality of sub-rolls is configured to have an individual degree of freedom to move toward the electrode sheet when pressed by the press portion.

2. The electrode supporting roll of claim 1, wherein the press portion comprises a height adjusting portion connected to a press roll, the height adjusting portion configured to be adjusted in length in a direction toward the main roll to reciprocally move the press roll toward the at least one of the plurality of sub-rolls.

3. The electrode supporting roll of claim 2, wherein the press portion comprises a support portion that is disposed on a first side of the height adjusting portion opposite a second side of the height adjusting portion that is connected to the press roll, the support portion being configured to support the height adjusting portion.

4. An electrode supporting roll that is configured to support an electrode sheet, the electrode supporting roll comprising:

a main roll that includes a plurality of sub-rolls rotatably coupled to a single first shaft, the plurality of sub-rolls configured to be placed in contact with the electrode sheet at a first side of the main roll; and a press portion that is positioned at a second side of the main roll opposite the first side, the press portion being configured to reciprocally move to push at least one of the plurality of sub-rolls toward the electrode sheet, wherein the press portion comprises a height adjusting portion connected to a press roll, the height adjusting portion configured to be adjusted in length in a direction toward the main roll to reciprocally move the press roll toward the at least one of the plurality of sub-rolls, wherein the press portion comprises a support portion that is disposed on a first side of the height adjusting portion opposite a second side of the height adjusting portion that is connected to the press roll, the support portion being configured to support the height adjusting portion, and wherein the support portion is movably coupled to a second shaft disposed parallel to the single first shaft, the support portion configured to move along the second shaft in a longitudinal direction of the second shaft.

5. The electrode supporting roll of claim 2, wherein the height adjusting portion is a cylinder or a screw.

6. The electrode supporting roll of claim 4, wherein the support portion is slidably coupled along the second shaft.

7. An electrode supporting roll that is configured to support an electrode sheet, the electrode supporting roll comprising:

a main roll that includes a plurality of sub-rolls rotatably coupled to a single first shaft, the plurality of sub-rolls configured to be placed in contact with the electrode sheet at a first side of the main roll; and a press portion that is positioned at a second side of the main roll opposite the first side, the press portion being configured to reciprocally move to push at least one of the plurality of sub-rolls toward the electrode sheet, wherein the electrode sheet comprises a coated portion and an uncoated portion, and the plurality of sub-rolls is configured such that one of the plurality of sub-rolls configured to be positioned adjacent to the uncoated portion of the electrode sheet is configured to be raised toward the electrode sheet side by the press portion to generate a step difference in a first gap between the at least one of the plurality of sub-rolls and the electrode sheet and a second gap between a remainder of the plurality of the sub-rolls and the electrode sheet.

8. The electrode supporting roll of claim 7, wherein the press portion is configured to reciprocally move in a direction perpendicular to the single first shaft, and the press portion is configured to reciprocally move to place the press roll against the one of the plurality of sub-rolls that is positioned adjacent to the uncoated portion.

9. The electrode supporting roll of claim 2, wherein the electrode supporting roll is configured to adjust a tension applied to the electrode sheet by adjusting the amount of movement of the plurality of sub-rolls using the height adjusting portion.

10. An electrode manufacturing apparatus comprising the electrode supporting roll of claim 1.

* * * * *